(12) United States Patent
Marques et al.

(10) Patent No.: US 8,957,621 B2
(45) Date of Patent: Feb. 17, 2015

(54) ACTUATOR HAVING A MULTIPHASE MOTOR, AND A METHOD OF CONTROLLING SUCH AN ACTUATOR

(71) Applicant: Sagem Defense Securite, Boulogne Billancourt (FR)

(72) Inventors: Frederic Marques, Boulogne Billancourt (FR); Matthieu Aubron, Boulogne Billancourt (FR); Jerome Piaton, Boulogne Billancourt (FR); Guillaume Mercier, Boulogne Billancourt (FR); Guillaume Percheron, Boulogne Billancourt (FR); Gaetan Princay, Boulogne Billancourt (FR)

(73) Assignee: Sagem Defense Securite, Boulogne-Billancourt (FR)

( * ) Notice: Subject to any disclaimer, the term of this patent is extended or adjusted under 35 U.S.C. 154(b) by 0 days.

(21) Appl. No.: 14/355,538

(22) PCT Filed: Nov. 21, 2012

(86) PCT No.: PCT/EP2012/073267
§ 371 (c)(1),
(2) Date: Apr. 30, 2014

(87) PCT Pub. No.: WO2013/076161
PCT Pub. Date: May 30, 2013

(65) Prior Publication Data
US 2014/0292242 A1    Oct. 2, 2014

Related U.S. Application Data

(60) Provisional application No. 61/562,841, filed on Nov. 22, 2011.

(51) Int. Cl.
*H02P 1/24* (2006.01)
*H02P 6/12* (2006.01)
*H02K 7/102* (2006.01)
*H02P 3/04* (2006.01)

(52) U.S. Cl.
CPC ......... *H02P 6/12* (2013.01); *H02K 7/102* (2013.01); *H02P 3/04* (2013.01)
USPC .......................................... 318/727; 318/801

(58) Field of Classification Search
USPC .................. 318/727, 798, 800, 801
See application file for complete search history.

(56) References Cited

U.S. PATENT DOCUMENTS 4,223,255 A * 9/1980 Goldman et al. ........ 318/400.41
4,785,213 A * 11/1988 Satake ............................ 310/116
5,442,250 A * 8/1995 Stridsberg ..................... 310/186

(Continued)

FOREIGN PATENT DOCUMENTS

CN    101 667 804 A    3/2010

*Primary Examiner* — Rina Duda
(74) *Attorney, Agent, or Firm* — Muncy, Geissler, Olds & Lowe, P.C.

(57) ABSTRACT

An actuator comprising at least one multiphase motor having phases facing a rotor secured to an outlet shaft associated with a braking member and provided with a connection to a movable element that is to be moved, the motors and the braking member being connected to at least one motor control unit for controlling the motors by powering their phases. The motor has at least four phases wound in such a manner as to avoid a neutral point, and in that the control unit has one single-phase inverter per phase and is arranged to implement a nominal, three-phase mode of control, and a degraded mode of control that enables the rotor to be driven in rotation by powering two non-collinear phases thereof.

9 Claims, 4 Drawing Sheets

(56) References Cited

U.S. PATENT DOCUMENTS

| | | | |
|---|---|---|---|
| 7,098,619 B2* | 8/2006 | Stridsberg | 318/563 |
| 7,227,273 B2* | 6/2007 | Ahmad et al. | 290/40 C |
| 7,609,024 B2* | 10/2009 | Ahmad et al. | 318/811 |
| 7,658,251 B2* | 2/2010 | James | 180/65.51 |
| 2002/0057070 A1 | 5/2002 | Thomsen et al. | |
| 2009/0214363 A1 | 8/2009 | Noh et al. | |

* cited by examiner

ACTUATOR HAVING A MULTIPHASE MOTOR, AND A METHOD OF CONTROLLING SUCH AN ACTUATOR

The present invention relates to an actuator having multiphase motors and usable in particular for moving a movable element. In an application of the invention to an aircraft, such a movable element may be constituted for example by a movable flight control surface of the aircraft, such as an aileron, which control surface is moved to enable the aircraft to be piloted.

Actuators are known that have a single-phase motor, or a DC motor with brushes, in which a rotor is connected to the movable element by a movement transmission assembly. When such actuators are used on aircraft for flight control purposes, provision is made to associate each movable flight control surface with at least two actuators, each of which is arranged to be capable of moving said flight control surface on its own. Thus, in the event of one of the actuators failing, the other actuator is used for moving the movable flight control surface without that impeding piloting of the aircraft. Such redundancy nevertheless gives rise to significant constraints in terms of integrating actuators in the structure of the aircraft (weight, cabling, . . . ) and provides only moderate additional safety.

It is also frequent to have recourse to actuators including two or even three motors (to ensure redundancy of their coils) with a corresponding number of control units (to ensure redundancy of the electronics) and with one power bridge per motor.

An object of the invention is to provide means for improving the availability of such actuators.

To this end, the invention provides an actuator comprising at least one multiphase motor having phases facing a rotor secured to an outlet shaft associated with a braking member and provided with means for connecting it to a movable element that is to be moved, the motors and the braking member being connected to at least one motor control unit for controlling the motors by powering their phases. The motor has at least four phases wound in such a manner as to avoid a neutral point, and the control unit has one single-phase inverter per phase and is arranged to implement a nominal mode of control over all of the phases, and a degraded mode of control that enables the rotor to be driven in rotation by powering two non-collinear phases thereof.

Thus, the actuator has a normal mode in which the actuator operates on at least three phases and a degraded mode in which the actuator operates on two phases. The degraded mode is implemented when the other phases can no longer be powered, e.g. as a result of an open circuit or of a short circuit on the phases or the circuits powering them. Increasing the number of phases around a common rotor and using one power bridge per phase increases the options for having a sufficient number of phases available for continuing to drive the rotor but without that excessively increasing the number of motors. The operating capacities of the actuator are thus extended, while maintaining size and weight that are reasonable.

The control unit preferably has a plurality of control modules connected to the various phases.

The degraded mode can then be implemented also when the phases cannot be powered as a result of a failure of a control module for powering them.

Other characteristics and advantages of the invention appear on reading the following description of particular, non-limiting embodiments of the invention.

Reference is made to the accompanying drawings, in which.

Figure 1:
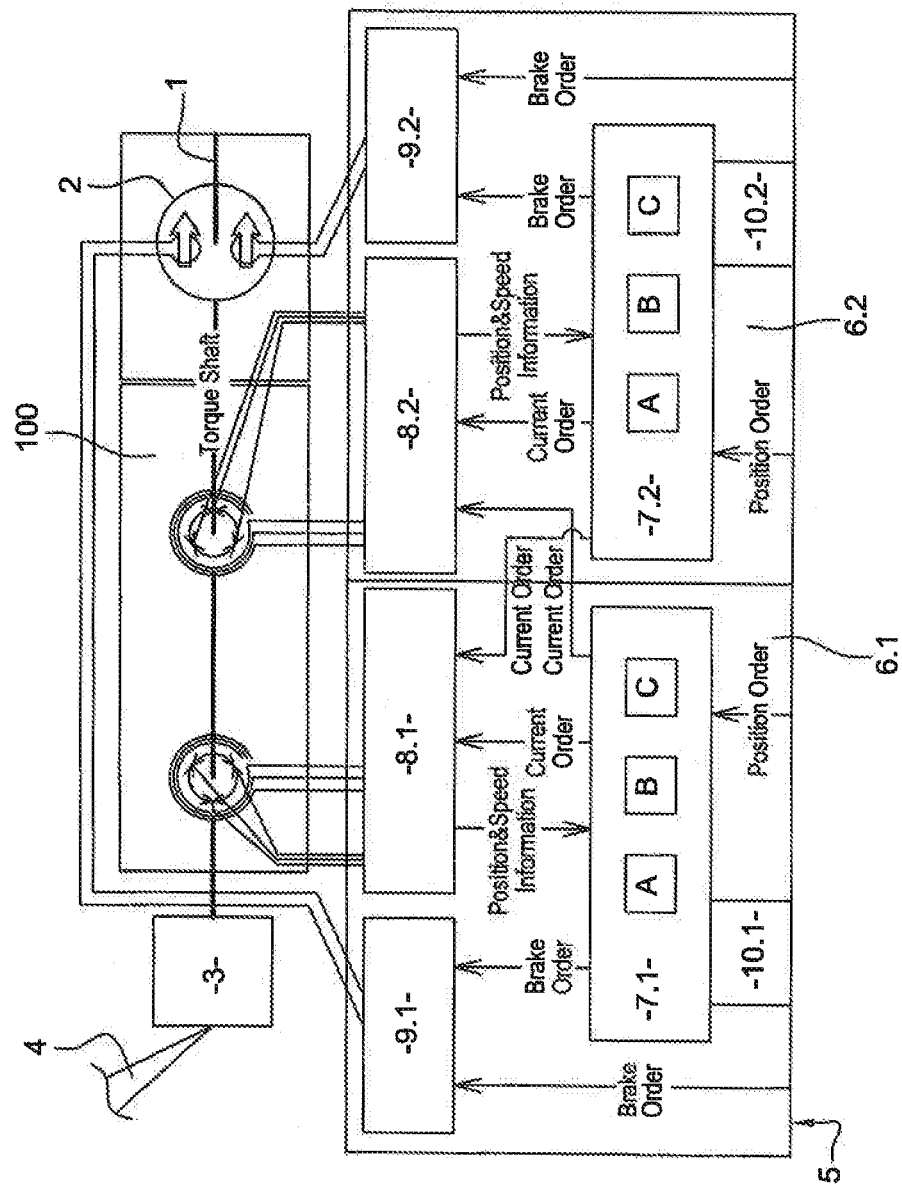
FIG. 1 is a diagrammatic view showing the general principle of an actuator in accordance with the invention.

With reference to FIG. 1, the actuator in accordance with the invention comprises a multiphase motor 100 having phases facing a rotor secured to an outlet shaft 1. In this example, the motor 100 is of the brushless type with its phases wound so as to avoid a neutral or "star" point. The outlet shaft 1 is associated with a braking member or brake 2 that is itself known, and it is also provided with means 3 for connecting it to a movable element 4 that is to be moved. By way of example, the connection means comprise a motion transmission system such as a screw and nut system or a crank and connecting rod system, and, by way of example, the movable element for moving may, be a movable flight control surface in an application to an aircraft.

The motor 100 and the braking member 2 are connected to at least one control unit, given overall reference 5, that is arranged to power them as a function of commands received from the central piloting control unit of the aircraft. The control unit 5 controls the motor by powering its phases.

The control unit 5 comprises two identical subunits 6.1 and 6.2, each incorporating a control module 7.1 or 7.2, a motor power module 8.1 or 8.2 respectively connected to two groups of phases of the motor 100, a power module 9.1 or 9.2 for powering the brake 2, which module is connected to a solenoid of the brake 2, and a power converter 10.1 or 10.2 serving to power the control modules 7.1 or 7.2. A power supply line is connected to power the power modules 8.1, 9.1, 8.2, and 9.2 directly.

Each control module 7.1 or 7.2 is arranged:

to collect information coming from the motor (speed, position, current, . . . ) and from the central piloting control unit (position orders for the movable element, braking instructions, . . . ); and to use said information to operate servo-control loops A, B, and C respectively for controlling speed, position, and current, thereby enabling it to control the power module 8.1 or 8.2 of the motor and the power module 9.1 or 9.2 of the brake.

For these purposes, the control module 7.1 or 7.2 is connected to means for determining the speed and the position of the movable element that is to be moved, and also to means for measuring the current flowing in the phases of the actuator, the position sensors thus comprising in particular two position sensors on respective sides of the motor, two sets of Hall effect sensors in this example. The control modules are each connected to one of these sets and they are arranged to communicate with each other in order to detect a faulty sensor so as to avoid processing the signals coming therefrom.

Each of the control modules 7.1 and 7.2 is connected to both of the power modules 8.1 and 8.2 in order to be able to control both of them. Thus, each of the control modules 7.1 and 7.2 can control both groups of phases in the event of the other control module failing. In normal operation, a so-called "master" one of the control modules 7.1 and 7.2 has priority over the other module referred to as a "slave".

The control unit 5 is arranged to implement a degraded mode of control that serves to drive the rotor in rotation by powering at least two non-collinear phases from among the phases.

Figure 2:
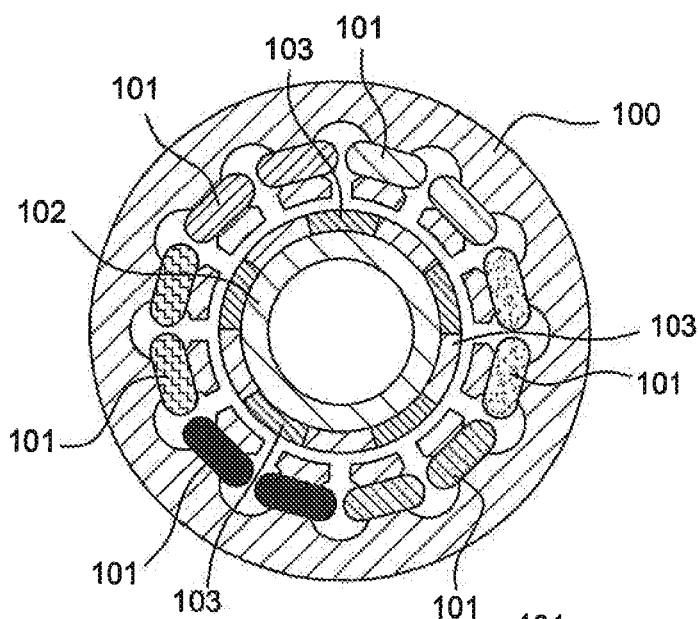
FIG. 2 is a diagrammatic cross-section view of a motor of an actuator in a first embodiment of the invention.
Figure 3:
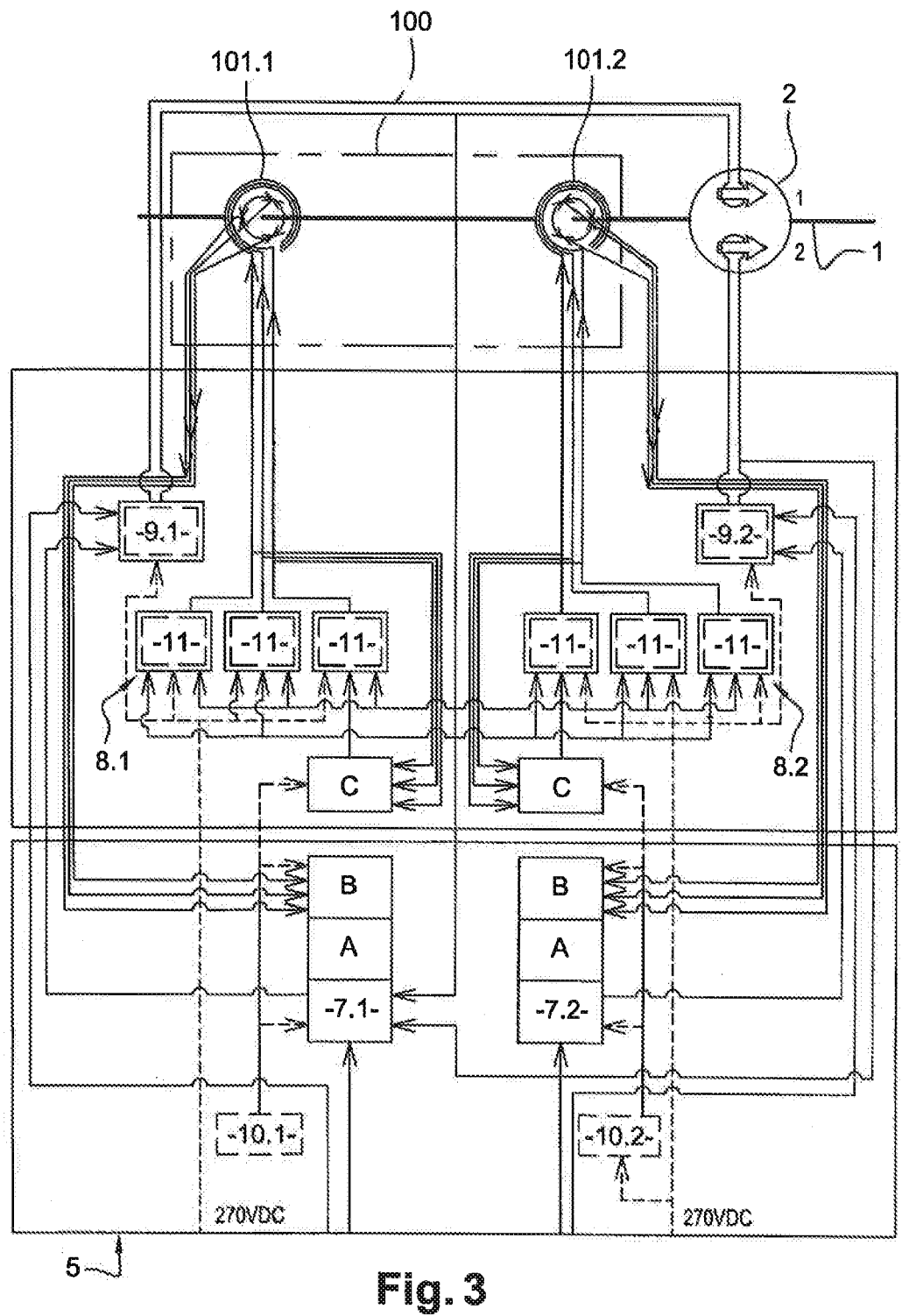
FIG. 3 is an electric circuit diagram for the FIG. 2 actuator.

With reference to FIGS. 2 and 3, and in a first embodiment, the motor 100 has six phases that are split into two groups 101.1 and 101.2 of three phases each, and a common rotor 102 having permanent magnets 103.

Each phase 101 of the group 101.1 or 101.2 is connected to an inverter 11 of a respective one of the power modules 8.1 or 8.2. The inverters 11 are single-phase H-connected bridges. There are thus as many inverters 11 as there are phases 101, with each power module 8.1 or 8.2 having three inverters 11.

The control unit 5 is arranged to implement a nominal mode of control in which the control unit 5 controls at least three and preferably six of the phases 101 of the motor 100 in conventional manner, and a degraded mode of control in which the control unit 5 controls two non-collinear phases 101 of the motor 100.

It can be understood that the nominal mode may be maintained even in the event of three phases failing since there remain three phases that can be controlled conventionally in three-phase manner.

In the degraded mode, the control unit 5 determines the currents $I_1(t)$ and $I_2(t)$ to be fed to the two remaining phases while delivering torque that is constant and independent of the position of the rotor 102.

Consideration is given to the geometrical frame of reference of the motor $\{P_1, P_2, P_i\}$ that is representative of the distribution of the $i$ phases in three dimensions, and also to the rectangular frame of reference $\{P_A, P_B\}$ that is the frame of reference for the two phases that are to be controlled and that is aligned on $P_1$ in such a manner that:

$$P_B = P_2 \sin \Phi_{geo}$$

and $$P_A = P_1 + P_2 \cos \Phi_{geo}$$

In order to obtain constant torque in the reference frame $\{P_A, P_B\}$, it is necessary to send currents $I_A = I_0 \cos \Theta$ and $I_B = I_0 \sin \Theta$, where $I_0$ is the amplitude of the control current and $\Theta$ is the angle between the phases.

This gives:

$$I_1 = \frac{I_0}{\sin \Phi_{geo}} \sin(\Phi_{geo} + \Theta)$$

$$I_2 = \frac{I_0 \sin \Theta}{\sin \Phi_{geo}}$$

The control unit 5 injects the corresponding currents into the remaining phases 101 of the motor 100.

The changeover from nominal mode to degraded mode is performed automatically and, in this example, under the control of the control unit 5 that, after performing self-checks, detects when it is not possible to power four of the phases. The self-checks may for example be performed on the basis of measurements taken by the means for determining the speed and the position of the movable element that is to be moved, and by the means for measuring the current flowing in the phases. It is also possible to provide other detector means for performing these failure tests, and for example means for detecting other electrical parameters of the actuator and/or means for detecting proper operation of portions of the control circuits, such as the servo-control loops.

By way of example:
in the event of a serious breakdown such as the loss of one of the electrical power supply networks, the control unit reconfigures the actuator to function with power being delivered to three out of the six phases;
in the event of a simple breakdown such as a short circuit on one motor phase, the control unit ensures operation using five out of the six phases; and
in the event of two breakdowns (the above serious breakdown and simple breakdown), the control unit reconfigures the actuator to operate using two out of six of the phases.

Thus, in the event of failures the actuator is reconfigured in real time.

It should be observed that this actuator structure also provides:
drive redundancy (the two groups of phases with their own control modules and detectors);
power supply redundancy (for control and drive purposes);
braking means redundancy (the two solenoids of the brake 2); and
electricity network redundancy.

Figure 4:
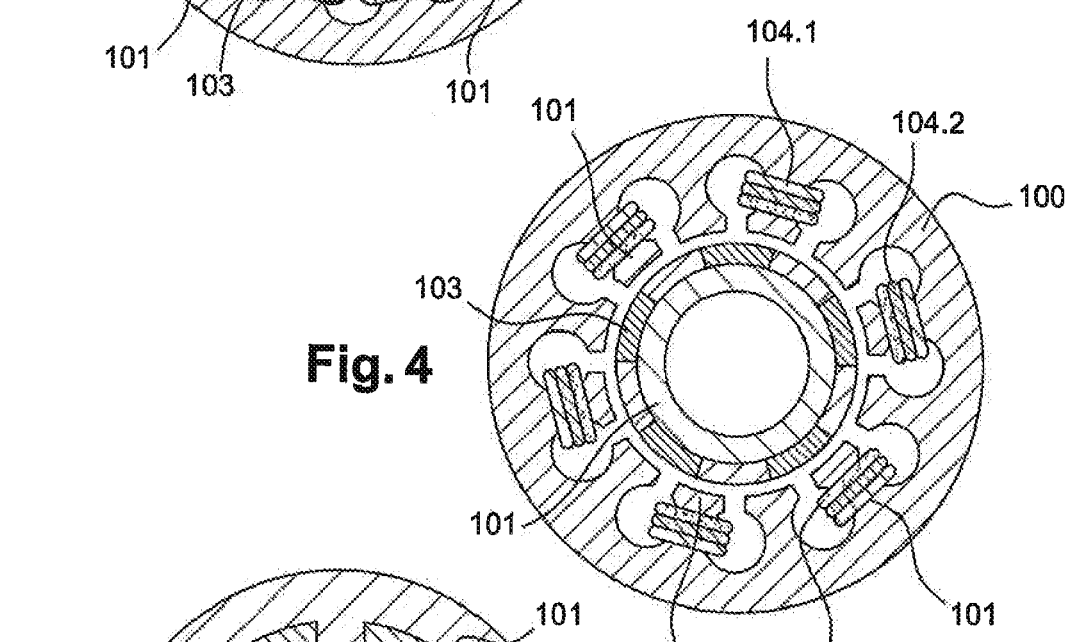
FIG. 4 is a diagrammatic cross-section view of a motor of an actuator in a second embodiment of the invention.
Figure 5:
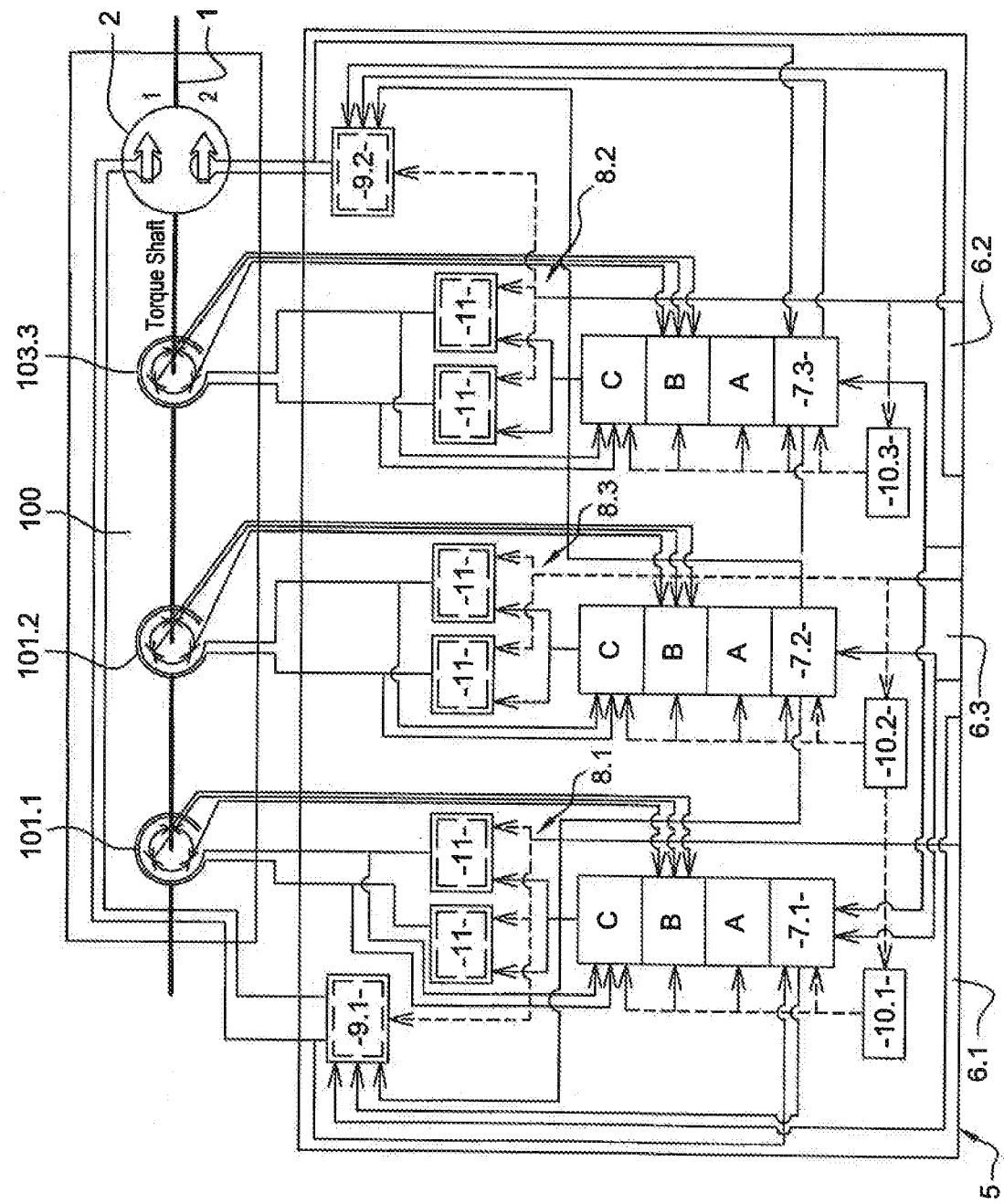
FIG. 5 is an electric circuit diagram of the FIG. 4 actuator.

In the following description of the second embodiments given with reference to FIGS. 4 and 5, elements that are identical or analogous to those described above are given the same numerical references.

The actuator in the second embodiment is generally identical in structure and in operation to the actuator of the first embodiment.

Nevertheless, in the second embodiment, the main motor 100 has a stator with six poles, each having three coils 104.1, 104.2, and 104.3 arranged thereabout, and a common rotor 102 having magnets 103. In this embodiment, the phases are distributed as three groups of two phases each.

The control unit 5 has three control modules 7.1, 7.2, and 7.3, and three power modules 8.1, 8.2, and 8.3. Each coil 104.1, 104.2, and 104.3 is connected to a respective inverter 11 of the power module 8.1, 8.2, or 8.3. Each inverter 11 is a single-phase H-connected bridge. There are therefore as many inverters 11 as there are phases 101, with each power module 8.1, 8.2, 8.3 having two inverters 11. In this embodiment it should be observed that only the subunits 6.1 and 6.2 include a respective module 9.1, 9.2 for powering the brake.

As above, the control unit 5 is arranged to implement a nominal mode of control in which the control unit 5 controls at least three phases of the motor 100 in conventional manner, and a degraded mode of control in which the control unit 5 controls two non-collinear phases of the motor 100.

Figure 6:
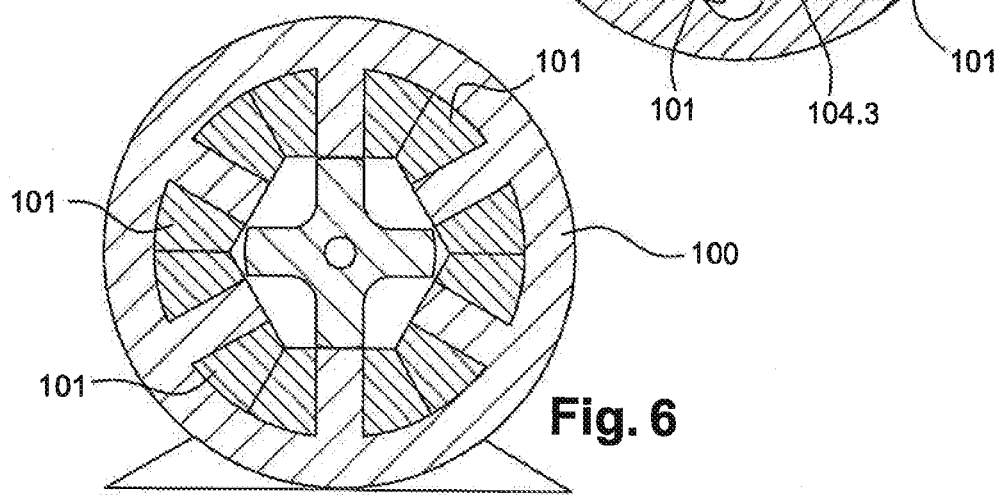
FIG. 6 is a diagrammatic cross-section view of a motor in a variant embodiment.

In the variant of FIG. 6, the rotor 102 is arranged to present reluctance that varies circumferentially. This variable reluctance is obtained by the shape of the cross-section of the rotor that is substantially in the form of a cross in this example.

The variable reluctance rotor makes it possible to avoid an opposing force appearing such as that which acts on the permanent magnet rotor when a phase of the motor is short circuited.

Naturally, the invention is not limited to the embodiments described but covers any variant coming within the ambit of the invention as defined by the claims.

In particular, the invention is applicable both to synchronous motors and to asynchronous motors.

The two groups of phases may be axially offset along the shaft of the motor, or they may even be mounted on two distinct stators.

At least some of the phases may be wound using wires having differing electrical conduction properties. This makes it possible to avoid having a neutral point.

The above-described embodiments may optionally be combined.

The invention claimed is:

1. An actuator comprising at least one multiphase motor having phases facing a rotor secured to an outlet shaft associated with a braking member and provided with means for connecting it to a movable element that is to be moved, the motors and the braking member being connected to at least one motor control unit for controlling the motors by powering their phases, the actuator being characterized in that the motor has at least four phases wound in such a manner as to avoid a neutral point, and in that the control unit has one single-phase inverter per phase and is arranged to implement a nominal mode of control over all of the phases, and a degraded mode of control that enables the rotor to be driven in rotation by powering two non-collinear phases thereof.

2. The actuator according to claim 1, wherein the motor has six phases subdivided into two groups of three phases.

3. The actuator according to claim 1, wherein the rotor has permanent magnets.

4. The actuator according to claim 1, wherein the rotor is arranged to present reluctance that varies circumferentially.

5. The actuator according to claim 1, wherein at least some of the phases are wound with wires having differing electric conduction properties.

6. The actuator according to claim 1, wherein at least two position sensors are arranged on either side of the motor and the control unit is arranged to isolate a faulty sensor.

7. The actuator according to claim 1, wherein the control unit has a plurality of control units connected to the set of phases.

8. The actuator according to claim 7, wherein the phases are six in number and the control unit has three control modules and three power modules, each connected to two phases and to each of the control modules.

9. The actuator according to claim 7, wherein the phases are six in number and the control unit has two control modules and three power modules each connected to three phases and to each control module.

* * * * *